(12) United States Patent  
Yang et al.

(10) Patent No.: US 10,884,112 B2  
(45) Date of Patent: Jan. 5, 2021

(54) FINGERPRINT POSITIONING METHOD AND SYSTEM IN SMART CLASSROOM

(71) Applicant: CENTRAL CHINA NORMAL UNIVERSITY, Hubei (CN)

(72) Inventors: Zongkai Yang, Hubei (CN); Sannvya Liu, Hubei (CN); Zhicheng Dai, Hubei (CN); Zengzhao Chen, Hubei (CN); Xiuling He, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 0 days.

(21) Appl. No.: 16/626,571

(22) PCT Filed: Nov. 29, 2018

(86) PCT No.: PCT/CN2018/118078  
§ 371 (c)(1),  
(2) Date: Dec. 26, 2019

(87) PCT Pub. No.: WO2019/233054  
PCT Pub. Date: Dec. 12, 2019

(65) Prior Publication Data  
US 2020/0142045 A1    May 7, 2020

(30) Foreign Application Priority Data

Jun. 4, 2018   (CN) .......................... 2018 1 0564419

(51) Int. Cl.  
*G01S 11/06*     (2006.01)  
*G01S 5/02*      (2010.01)  
(Continued)

(52) U.S. Cl.  
CPC ............. *G01S 11/06* (2013.01); *G01S 5/0252* (2013.01); *G01S 5/02521* (2020.05);  
(Continued)

(58) Field of Classification Search  
CPC .... G01S 11/06; G01S 5/0252; G01S 5/02521; G01S 5/02523; G01S 5/02524;  
(Continued)

(56) References Cited

U.S. PATENT DOCUMENTS

2013/0273938 A1* 10/2013 Ng ........................... G01S 5/06  
455/456.1  
2018/0167783 A1*  6/2018 Khoche ................... B32B 37/06  
(Continued)

FOREIGN PATENT DOCUMENTS

CN           107333276           11/2017  
CN           107333276 A       * 11/2017

*Primary Examiner* — Magdi Elhag  
(74) *Attorney, Agent, or Firm* — JCIP Global Inc.

(57) ABSTRACT

The disclosure discloses a fingerprint positioning method in a smart classroom, which is specifically: firstly, performing Gaussian filtering and taking the average value on a wireless signal strength value RSSI in the fingerprint database; then finding the neighbor point closest to the signal strength of the to-be-measured point; finally, the Euclidean distance is used as the weight reference, and the weighted center of mass is obtained for the nearest neighbor points. The weight index is introduced as an index of the weight, and the coordinates of the to-be-tested node are obtained. The disclosure has a higher positioning accuracy, smaller positioning error fluctuations and greater environmental adaptability.

4 Claims, 4 Drawing Sheets

(51) Int. Cl.

| | |
|---|---|
| *H04B 17/318* | (2015.01) |
| *H04W 4/33* | (2018.01) |
| *H04W 4/80* | (2018.01) |
| *H04W 4/021* | (2018.01) |
| *H04W 4/02* | (2018.01) |
| *H04W 8/00* | (2009.01) |
| *H04W 64/00* | (2009.01) |

(52) U.S. Cl.
CPC .......... *H04B 17/318* (2015.01); *H04W 4/021* (2013.01); *H04W 4/023* (2013.01); *H04W 4/33* (2018.02); *H04W 4/80* (2018.02); *H04W 8/005* (2013.01); *H04W 64/003* (2013.01)

(58) Field of Classification Search
CPC ....... G01S 5/02527; H04W 4/33; H04W 4/80; H04W 4/021; H04W 4/023; H04W 4/005; H04W 64/003
See application file for complete search history.

(56) References Cited

U.S. PATENT DOCUMENTS

| | | | |
|---|---|---|---|
| 2018/0352585 A1* | 12/2018 | Yang | ........................ H04W 4/30 |
| 2020/0045665 A1* | 2/2020 | Kuang | ................. H04B 17/318 |

* cited by examiner

FINGERPRINT POSITIONING METHOD AND SYSTEM IN SMART CLASSROOM

CROSS-REFERENCE TO RELATED APPLICATION

This application is a 371 of international application of PCT application serial no. PCT/CN2018/118078, filed on Nov. 29, 2018, which claims the priority benefit of China application no. 201810564419.8, filed on Jun. 4, 2018. The entirety of each of the above mentioned patent applications is hereby incorporated by reference herein and made a part of this specification.

BACKGROUND

Technical Field

The disclosure belongs to the field of positioning technology, and more specifically relates to a fingerprint positioning method and system in a smart classroom.

Description of Related Art

In a smart classroom, it is important to carry out attendance check and take records, conduct real-time interaction between teachers and students, transmit teaching-related data and record and perform group-interaction based teaching, but these tasks are essentially based on the students' positions in the classroom space, so there is an urgent need to conduct research and studies on classroom space positioning. A variety of indoor positioning technologies have emerged for complex indoor environments, such as positioning technologies based on wireless local area networks, RFID, ZigBee and iBeacon. Indoor positioning based on iBeacon technology has the advantages of low cost and low power consumption, so many researches on indoor positioning algorithms based on iBeacon technology have been developed.

iBeacon is a Bluetooth technology with low power consumption that operates based on the principle similar to previous Bluetooth technologies. Signals are transmitted from iBeacon, a Bluetooth device is positioned and accepts the signals, and feedback the signals. When a user enters, exits, or move around within an area, the iBeacon's broadcast is able to propagate, and the distance between the user and the iBeacon can be calculated (calculation can be performed through the received signal strength indicator RSSI).

Typical indoor positioning methods are based on direction of arrival (DOA), time difference of arrival (TDOA), time of arrival (TOA), received signal strength indicator (RSSI) and so on. The RSSI based indoor positioning algorithm is mainly divided into two categories, namely, the geometric positioning method based on ranging and the fingerprint positioning method based on pattern matching model.

The core algorithms used by fingerprint positioning generally include machine learning algorithms such as K-nearest neighbor (KNN), support-vector machines (SVM), neural network, and decision tree. The algorithm of the KNN model is widely adopted because of its complexity, low hardware cost and computational cost. Therefore, the KNN algorithm is an algorithm mainly used for indoor fingerprint positioning. The improvement of the weight of the fingerprint positioning algorithm based on KNN is made mainly in two aspects. The first aspect is to introduce the weight when calculating the Euclidean distance for matching.

For example, in literature [1] (Chen Shunming, Li Ping. Research on environment adaptive indoor positioning algorithm based on RSSI weight [J]. Computer Engineering and Applications, 2015, 51(22): 99-103), RSSI-based weights are introduced when calculating Euclidean distance for matching, and environmental adaptation is improved. The second aspect is to introduce the weight, that is, the weighted center of mass, when finding the nearest neighbor points to solve the center of mass, and the position of the center of mass is the final estimate of position. With such algorithm, the environmental adaptability and positioning accuracy are improved, but the algorithms is more complicated.

For example, literature [2] (Peng Hong, Zhao Yang, Xia Tianpeng. WSN weighted center of mass positioning algorithm based on optimized RSSI accuracy [J]. Computer Engineering and Applications, 2015, 51 (21): 88-91) is a type of optimized weighted center of mass algorithm which uses the reciprocal of the actual distance between the reference node and to-be-tested node as the weight. Since the indoor environment is relatively complicated, the actual distance determined based on the signal attenuation model has large deviation; besides, the weight is fixed, there is no environmental adaptability, and the positioning accuracy is not high.

In another example, literature [3] (Wu Zetai, Cai Renqin, Xu Shuyan, Wu Xiaosi, Fu Yuli. Research and improvement of WiFi positioning based on K-nearest neighbor method [J]. Computer Engineering, 2017, 43(03): 289-293) obtains estimated coordinates based on the weight of the similarity between the to-be-trained sample and trained samples by weighting the center of mass. Although the positioning time is shortened, the accuracy is not improved and there is no environmental adaptability. It can be learned that there is no research based on the Euclidean distance weight, and current researches have poor adaptability with respect to the complex indoor environment.

SUMMARY

To solve the problem of low positioning accuracy, poor environmental adaptability and unstable positioning result in conventional indoor fingerprint positioning algorithms, the present disclosure provides a fingerprint positioning method in a smart classroom with the purpose of improving indoor positioning accuracy, environmental adaptability and stability of positioning results.

An indoor fingerprint positioning method includes an offline database establishing phase and an online positioning phase;

Specifically, the offline database establishing phase is:

(S1) Arranging P iBeacons inside the room as the wireless signal transmitting terminals; gridding the room, defining an intersection point of a grid as an anchor node, recording the physical coordinates of the nth anchor node $L_n=(x_n, y_n)$, $n=1, \ldots, N$;

(S2) collecting a signal strength value $RSSI_{ij}^n$ transmitted by the jth iBeacon at the nth anchor node, at the ith sampling moment, $n=1, \ldots, N$, $i=1, \ldots, M$, $j=1, \ldots, P$;

(S3) Gaussian filtering and averaging the M signal strength values transmitted by the jth iBeacon collected at the nth anchor node, and an average is used as a standard signal strength values of the jth iBeacon collected at the nth anchor node and recorded as the original fingerprint $F_n = (P_{Ran1}, \ldots, P_{RanP})$, $n=1, \ldots, N$;

(S4) constituting a fingerprint database, n=1, . . . , N, by the physical coordinates $L_n=(x_n, y_n)$ at the nth anchor node and the corresponding original fingerprint $F_n=(P_{Ran1}, \ldots, P_{RanP})$;

Specifically, the online positioning phase comprises:

(T1) collecting the signal strength value $RSSI_j$ transmitted by the jth iBeacon at the to-be-measured point, j=1, . . . , P;

(T2) according to the signal strength value $RSSI_j$, j=1, . . . , P searches for K anchor nodes that are the closest to its signal strength value in the fingerprint database as the reference anchor nodes;

(T3) calculating a coordinate (X, Y) of the to-be-measured point according to the reference anchor nodes:

$$\begin{cases} X = \omega_1 x_1 + \omega_2 x_2 + \ldots + \omega_k x_k \\ Y = \omega_1 y_1 + \omega_2 y_2 + \ldots + \omega_k y_k \end{cases},$$

$(x_k, y_k)$ is the coordinate of the kth reference anchor node, $\omega_k$ is the weight coefficient, k=1, . . . , K;

In the weight coefficient $$\omega_k = \frac{(1/d_k)^\beta}{\sum_{k=1}^{K}(1/d_k)^\beta},$$

$d_k$ represents the Euclidean distance between the to-be-measured point and the kth reference anchor node, $\beta$ is the second weight index.

Further, the specific implementation of the step (T2) is: calculating the Euclidean distance $D(n) = \sqrt{\sum_{n=1}^{N} \omega_j'^* P_{Ranj} - RSSI_j)^2}$ between to-be-measured point and the anchor node according to the signal strength, j=1, . . . , P, wherein, $$\omega_j' = \frac{1}{|(RSSI_j)^\alpha|},$$

$\alpha$ is the first weight index.

Further, the specific implementation of the step (S3) Gaussian filtering and averaging is:

At the nth anchor node, n=1, L, N, determining the confidence interval of the signal strength $$\left(\overline{RSSI_j^n} - 0.845 \frac{\sigma^n}{\sqrt{M}}, \overline{RSSI_j^n} + 0.845 \frac{\sigma^n}{\sqrt{M}}\right), \text{wherein,}$$

$$\overline{RSSI_j^n} = \frac{1}{M}\sum_{i=1}^{M} RSSI_{ij}^n,$$

$$\sigma_n = \sqrt{\frac{1}{M-1}\sum_{i=1}^{M}(RSSI_{ij}^n - \overline{RSSI_j^n})^2}, j=1, \ldots, P;$$

At nth anchor node, n=1, . . . , N, extracting the M' signal strengths $RSSI_{i'j}^n$, i'=1, . . . , M' in the confidence interval, calculating the average of the extracted M' signal strengths $$P_{Ranj} = \frac{1}{M'}\sum_{i'=1}^{M'} RSSI_{i'j}^n, j=1, \ldots, P.$$

An indoor fingerprint positioning system, including P iBeacon wireless signal transmitting terminals, Bluetooth devices and a data processing center;

iBeacon for transmitting wireless signals;

Bluetooth device for collecting wireless signals;

the data processing center configured to position the to-be-measured point according to the collected wireless signal, specifically:

including the offline database establishing phase and the online positioning phase;

wherein, specifically, the offline database establishing phase comprises:

(S1) gridding the room, gridding the intersection point as an anchor node, recording the physical coordinates of the nth anchor node $L_n=(x_n, y_n)$, n=1, . . . , N;

(S2) collecting the signal strength value $RSSI_{ij}^n$ transmitted by the jth iBeacon at the nth anchor node, at the ith sampling moment, n=1, . . . , N, i=1, . . . , M, j=1, . . . , P;

(S3) Gaussian filtering and averaging the M signal strength values transmitted by the jth iBeacon collected at the nth anchor node, and an average is used as a standard signal strength values of the jth iBeacon collected at the nth anchor node and recorded as the original fingerprint $F_n=(P_{Ran1}, \ldots, P_{RanP})$, n=1, . . . , N;

(S4) constituting a fingerprint database, n=1, . . . , N, by a physical coordinates $L_n=(x_n, y_n)$ at the nth anchor node and the corresponding original fingerprint $F_n=(P_{Ran1}, \ldots, P_{RanP})$;

wherein, specifically the online positioning phase comprises:

(T1) collecting the signal strength value $RSSI_j$ transmitted by the jth iBeacon at a to-be-measured point, j=1, . . . , P;

(T2) according to the signal strength value $RSSI_j$, j=1, . . . , P searches for the K anchor nodes that are the closest to its signal strength value in the fingerprint database as the reference anchor nodes;

(T3) calculating a coordinate (X, Y) of the to-be-measured point according to the reference anchor nodes:

$$\begin{cases} X = \omega_1 x_1 + \omega_2 x_2 + \ldots + \omega_k x_k \\ Y = \omega_1 y_1 + \omega_2 y_2 + \ldots + \omega_k y_k \end{cases},$$

$(x_k, y_k)$ is the coordinate of the kth reference anchor node, $\omega_k$ is the weight coefficient, k=1, . . . , K;

wherein in the weight coefficient $$\omega_k = \frac{(1/d_k)^\beta}{\sum_{k=1}^{K}(1/d_k)^\beta},$$

$d_k$ represents the Euclidean distance between the to-be-measured point and the kth reference anchor node, $\beta$ is the second weight index.

The beneficial technical effects of the present disclosure are embodied in:

The disclosure firstly performs Gaussian filtering and averaging on the wireless signal strength value RSSI in the fingerprint database; then finds the neighbor point that is the closest to the signal strength of the to-be-measured point. Finally, the Euclidean distance is used as the weight reference, and the weighted center of mass is obtained for the nearest neighbors. The weight index is introduced as an index of the weight, and the coordinates of the to-be-tested node are obtained. The disclosure has higher positioning accuracy, smaller positioning error fluctuation and greater environmental adaptability.

DESCRIPTION OF THE EMBODIMENTS

In order to make the purpose, technical solutions and advantageous effect of the present disclosure clearer, the disclosure is further described in detail below with reference to accompanying drawings and embodiments. It should be understood that the specific embodiments described herein are merely illustrative of the disclosure and are not intended to limit the disclosure. In addition, the technical features involved in the various embodiments of the present disclosure can be combined with each other as long as they do not form a conflict with each other.

Figure 1:
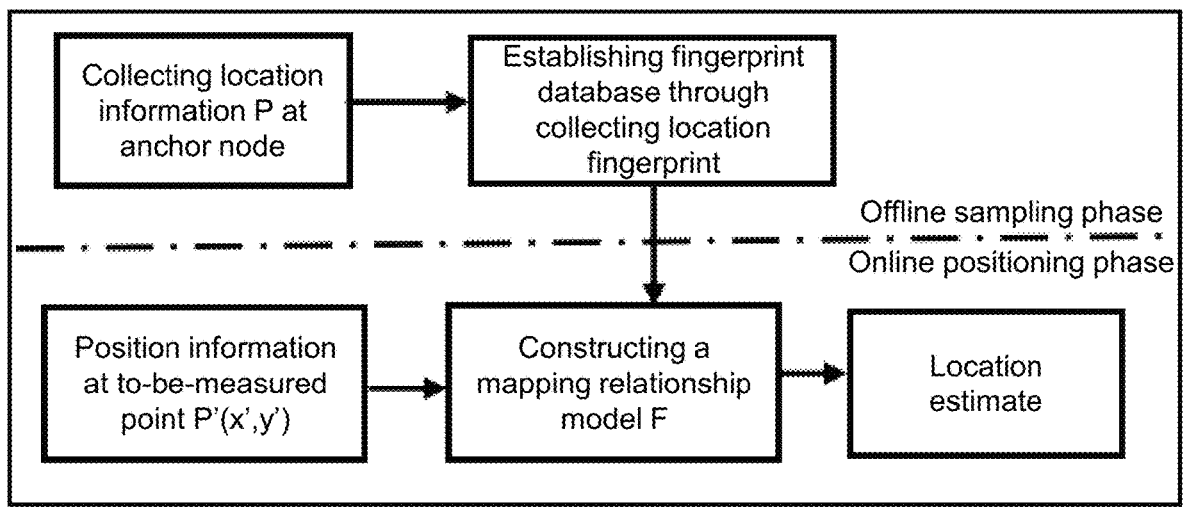
FIG. 1 is a block diagram of indoor fingerprint positioning.

FIG. 1 is a block diagram showing the flowchart of the method of the disclosure, including an offline database establishing phase and an online positioning phase.

Specifically, the offline database establishing phase is the following:

(S1) arranging P iBeacons inside the room as the wireless signal transmitting terminals; gridding the room, defining an intersection point of a grid as an anchor node, recording the physical coordinates of the nth anchor node $L_n=(x_n, y_n)$, $n=1, \ldots, N$.

The actual ground of the application scenario is gridded. The optimal gridding scheme that is adopted is dividing the ground into square grids of 1 m×1 m=1 m². The iBeacon equipment is arranged on the ceiling or wall of the application site. The optimal layout scheme is to deploy four iBeacon devices at four corners of a venue with a size of 10 m×10 m=100 m².

(S2) collecting the signal strength value $RSSI_{ij}^n$ transmitted by the jth iBeacon at the nth anchor node, at the ith sampling moment, $n=1, \ldots, N$, $i=1, \ldots, M$, $j=1, \ldots, P$.

(S3) Gaussian filtering and averaging the M signal strength values transmitted by the jth iBeacon collected at the nth anchor node, and an average is used as a standard signal strength values of the jth iBeacon collected at the nth anchor node and recorded as the original fingerprint $F_n=(P_{Ran1}, \ldots, P_{RanP})$, $n=1, \ldots, N$.

According to a preferred embodiment, the specific implementation of Gaussian filtering and averaging is:

At the nth anchor node, $n=1, \ldots, N$, determining the confidence interval for signal strength $$\left(\overline{RSSI_j^n} - 0.845 \frac{\sigma^n}{\sqrt{M}}, \overline{RSSI_j^n} + 0.845 \frac{\sigma^n}{\sqrt{M}}\right), \text{wherein,}$$

$$\overline{RSSI_j^n} = \frac{1}{M} \sum_{i=1}^{M} RSSI_{ij}^n,$$

$$\sigma_n = \sqrt{\frac{1}{M-1} \sum_{i=1}^{M} (RSSI_{ij}^n - \overline{RSSI_j^n})^2}, j = 1, \ldots, P;$$

At nth anchor node, $n=1, \ldots, N$ extracting the M' signal strengths $RSSI_{i'j}^n$, $i'=1, \ldots, M'$ in the confidence interval, calculating the average of the extracted M' signal strengths $$P_{Ranj} = \frac{1}{M'} \sum_{i'=1}^{M'} RSSI_{i'j}^n, j = 1, \ldots, P.$$

(S4) constituting a fingerprint database, $n=1, \ldots, N$, by the physical coordinates $L_n=(x_n, y_n)$ at the nth anchor node and the corresponding original fingerprint $F_n=(P_{Ran1}, \ldots, P_{RanP})$.

Specifically, the online positioning phase comprises:

(T1) collecting the signal strength value $RSSI_j$, $j=1, \ldots, P$ transmitted by the jth iBeacon at a to-be-measured point, $j=1, \ldots, P$.

(T2) according to the signal strength value $RSSI_j$, $j=1, \ldots, P$ searches for the K anchor node that are the closest to its signal strength value in the fingerprint database as the reference anchor nodes.

According to a preferred embodiment: calculating the Euclidean distance $D(n)=\sqrt{\sum_{n=1}^{N} \omega'_j \cdot (P_{Ranj}-RSSI_j)^2}$ between the to-be-measured point and the anchor node according to the signal strength, $j=1, \ldots, P$, wherein, $$\omega'_j = \frac{1}{|(RSSI_j)^\alpha|},$$

α is the first weight index.

(T3) Calculating the coordinate (X, Y) of the to-be-measured point according to the reference anchor nodes:

$$\begin{cases} X = \omega_1 x_1 + \omega_2 x_2 + L + \omega_k x_k \\ Y = \omega_1 y_1 + \omega_2 y_2 + L + \omega_k y_k \end{cases},$$

$(x_k, y_k)$ is the coordinate of the kth reference anchor node, $\omega_k$ is the weight coefficient, $k=1, \ldots, K$.

In the weight coefficient $$\omega_k = \frac{(1/d_k)^\beta}{\sum_{k=1}^{K} (1/d_k)^\beta},$$

$d_k$ represents the Euclidean distance between the to-be-measured point and the kth reference anchor node. The weight index β can be determined through experiments. Or, since its change causes change of average error, there is a functional relationship between β and the average error. Curve fitting is performed according to the weight index and the scatter plot of average positioning error, and the β value of the smallest value taken from the average positioning error is the optimal value.

Calculation of α is the same as the calculation of β, and function relation equation of the α and the average positioning error is determined through experiments or curve fitting, the extremum of the function is solved to determine the optimal α value.

Figure 2:
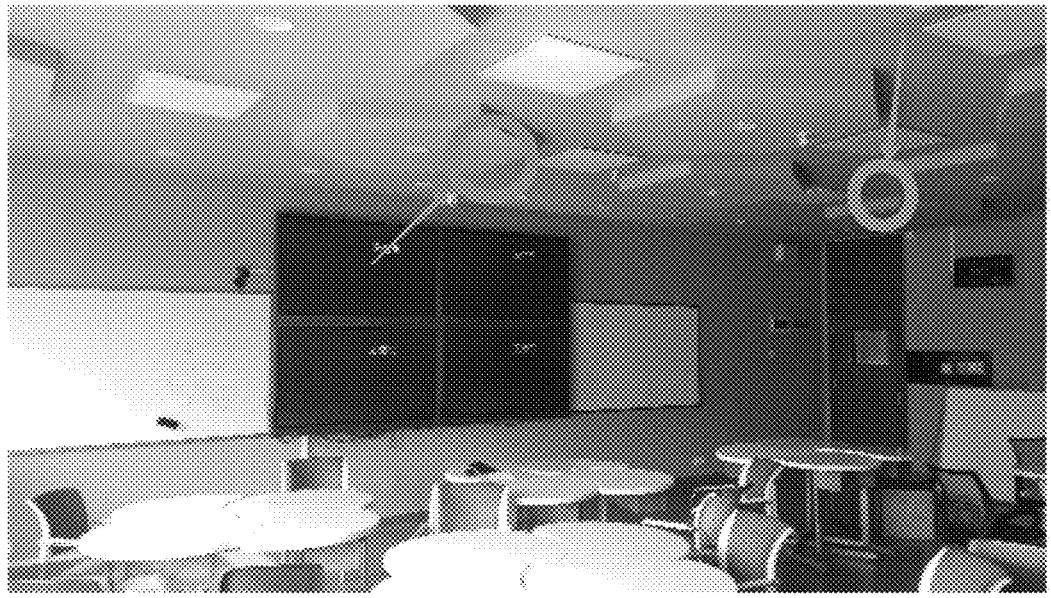
FIG. 2 is an actual scene of an experimental environment.

The following example is described in details below with reference to the experimental site shown in FIG. 2.

The total area of the classroom is 11.8 m×7.3 m=85.78 m², and 7 m×7 m=49 m² is taken as the experimental area. This experiment requires the deployment of 4 iBeacon devices on the ceiling of the smart classroom. The iBeacon equipment adopted in the experiment is manufactured by SENSORO company. The broadcast frequency is of 100 ms-1285 ms and can be adjusted separately. The circle indicated by the arrow in the center is the installation location of the iBeacon device. The device for sensing wireless access point is selected from an Android-based smartphone, model Redmi Note 4X, as a wireless access point with an RSSI value acquisition tool.

Offline Database Establishing Phase:

Step 1: The 4 iBeacon devices required for the experiment are arranged on the classroom ceiling.

Step 2: The experiment area of the classroom is gridded by intervals of one meter, and the grid intersection is used as an anchor node. The RSSI values of the anchor node are collected through the mobile phone. This experiment collects 4D RSSI samples from the 4 iBeacon devices at 25 to-be-tested nodes and 64 anchor nodes. A total of 21360 RSSI samples are collected.

Step 3: The collected RSSI values are processed by Gaussian filtering, and then the geometric average is obtained. Thereafter, the geometric average and the actual physical coordinates together constitute location fingerprint information to establish a fingerprint database.

Figure 6:
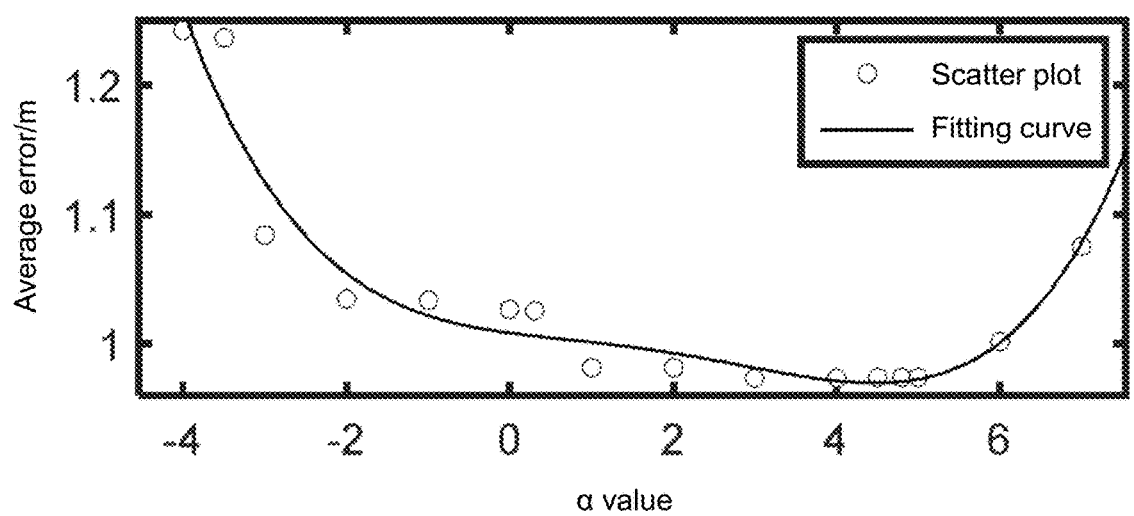
FIG. 6 is a fitting curve diagram of α and the mean error.

Online Positioning Phase:

Step 4: The RSSI data of the to-be-measured point is collected, and weighted Euclidean distances between each to-be-measured point to all anchor nodes are calculated. By the mapping relationship F, weighted KNN matching algorithm is used to match the data of location fingerprint space. In the example, RSSI is used as a weight reference to find the K nearest neighbor points to perform curve fitting on the weight index variable and average positioning error. FIG. 6 shows that fitting curve. When the average error is the smallest, the weight index parameter is the optimal value. The optimal value a of the present experimental environment weight index is 4.3.

Figure 7:
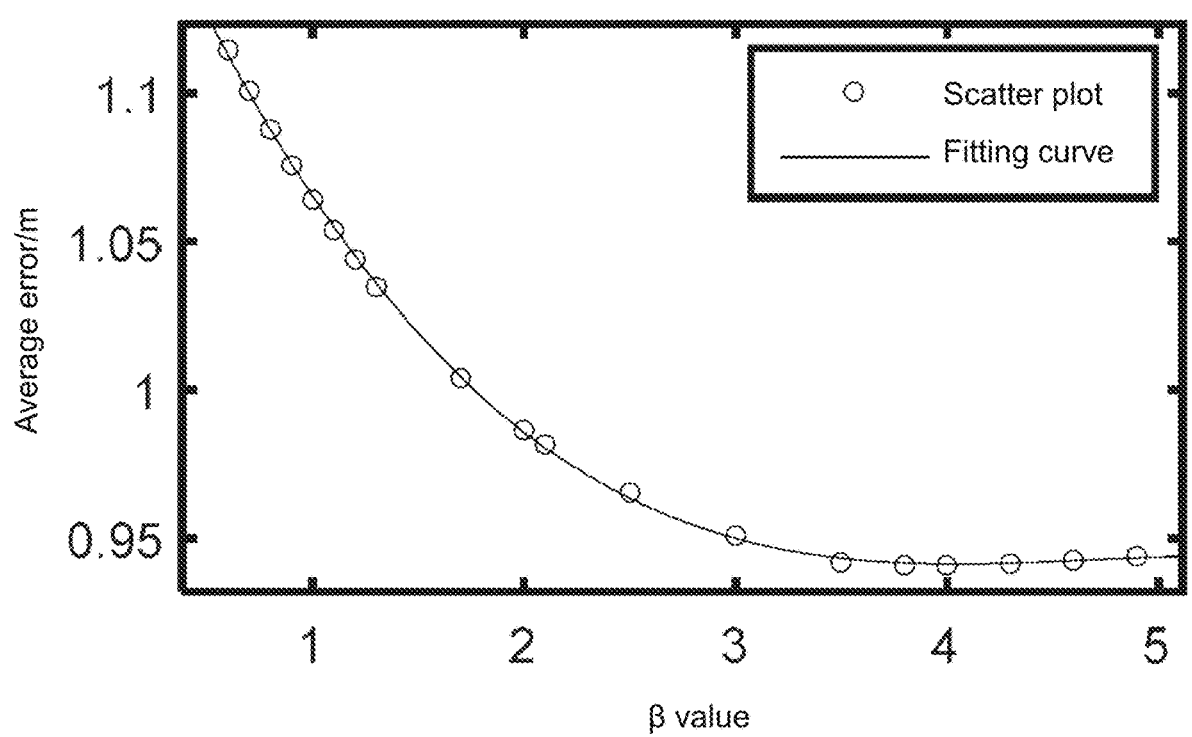
FIG. 7 is a fitting curve diagram of β and the mean error.

Step 5: The weighted Euclidean distance reciprocal calculated in step 4 is used as the weight, and the weight index β is used as the index variable. The weight index parameter and the average positioning error are subjected to curve fitting, and the fitting curve is as shown in FIG. 7. The weight index parameter with the smallest average error is the optimal value, and the weighted center of mass of the nearest neighbor points is calculated. The weighted center of mass is solved for the nearest K anchor nodes as the coordinates of the to-be-measured point.

Step 6: Performance indicators such as positioning error, error variance and smallest error are calculated, and the method is evaluated by comparing with other algorithms in terms of performance.

Figure 3:
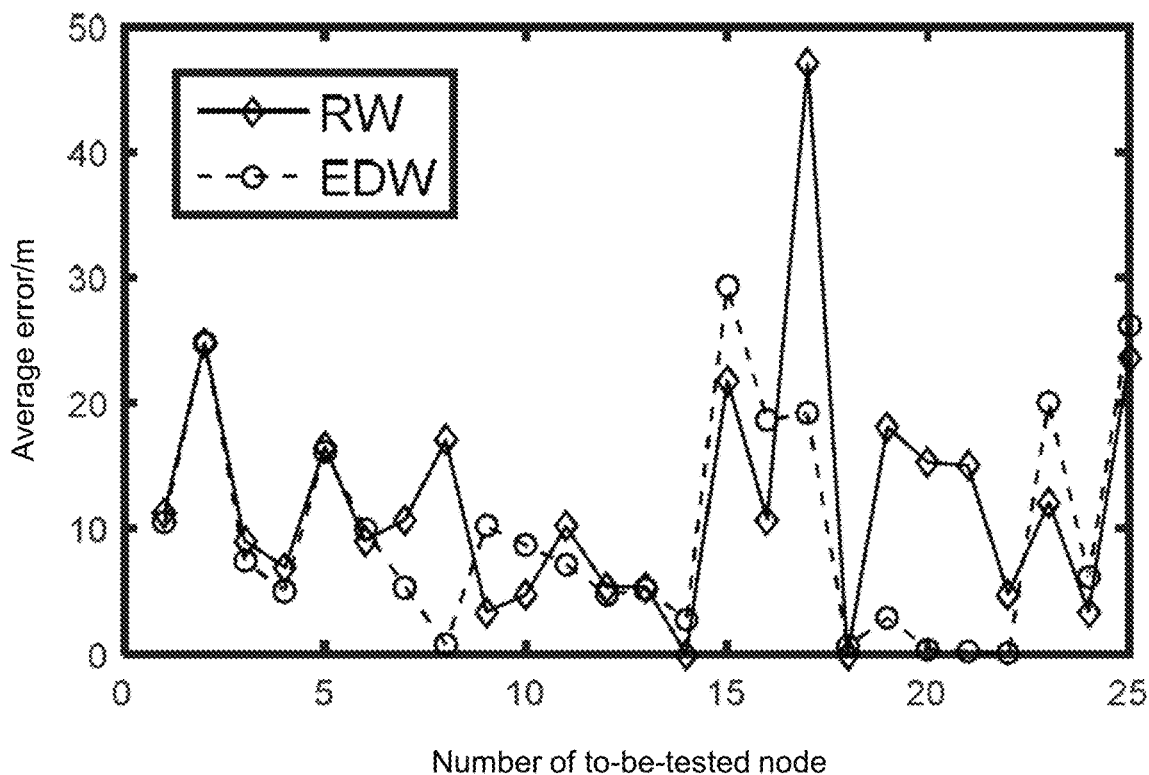
FIG. 3 is a graph showing the relationship between the to-be-tested node and the average error.

FIG. 3 uses the EDW algorithm and the Raoul Wallenberg (RW) algorithm in literature [1] for positioning. In comparisons of positioning error of to-be-measured nodes, the algorithm described in this present application is referred to as EDW algorithm. It is shown in the figure that, for most of the to-be-tested nodes, the improved EDW algorithm has smaller average error than the RW algorithm, and the image fluctuation is also smaller, which shows that the EDW algorithm has a significantly better positioning accuracy than the RW algorithm, and the positioning result is more stable.

Figure 4:
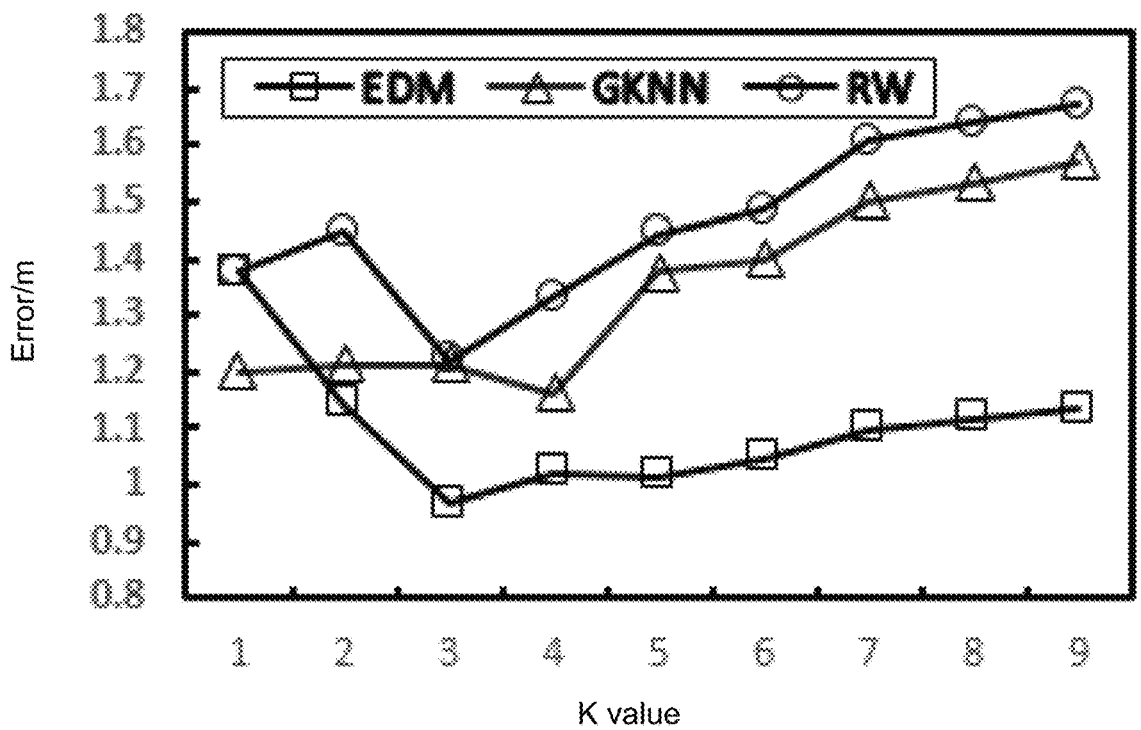
FIG. 4 is a graph showing the relationship between the nearest neighbors K value and the error of each algorithm.

FIG. 4 is a diagram that shows variations of KNN, GKNN (Gauss K-nearest neighbor) and EDW algorithm average error as the number of K nearest neighbor points increases. In the diagram, the GKNN algorithm is a KNN algorithm after Gaussian filtering. It can be seen that, initially, as K increases, the average error began to decrease. After passing a lowest point, the average error increases with the increase of K, indicating that the difference in the number of K nearest neighbor points has a greater impact on the positioning results. By selecting the appropriate K value, the above algorithms can all achieve the smallest error. The EDM algorithm has the smallest error when K value is 3, which is smaller than the smallest error values obtained from all the algorithms above, indicating that when the K value is different, the EDM has better positioning accuracy as compared with the GKNN algorithm and the RW algorithm. Meanwhile, the EDM image has smaller fluctuations.

Figure 5:
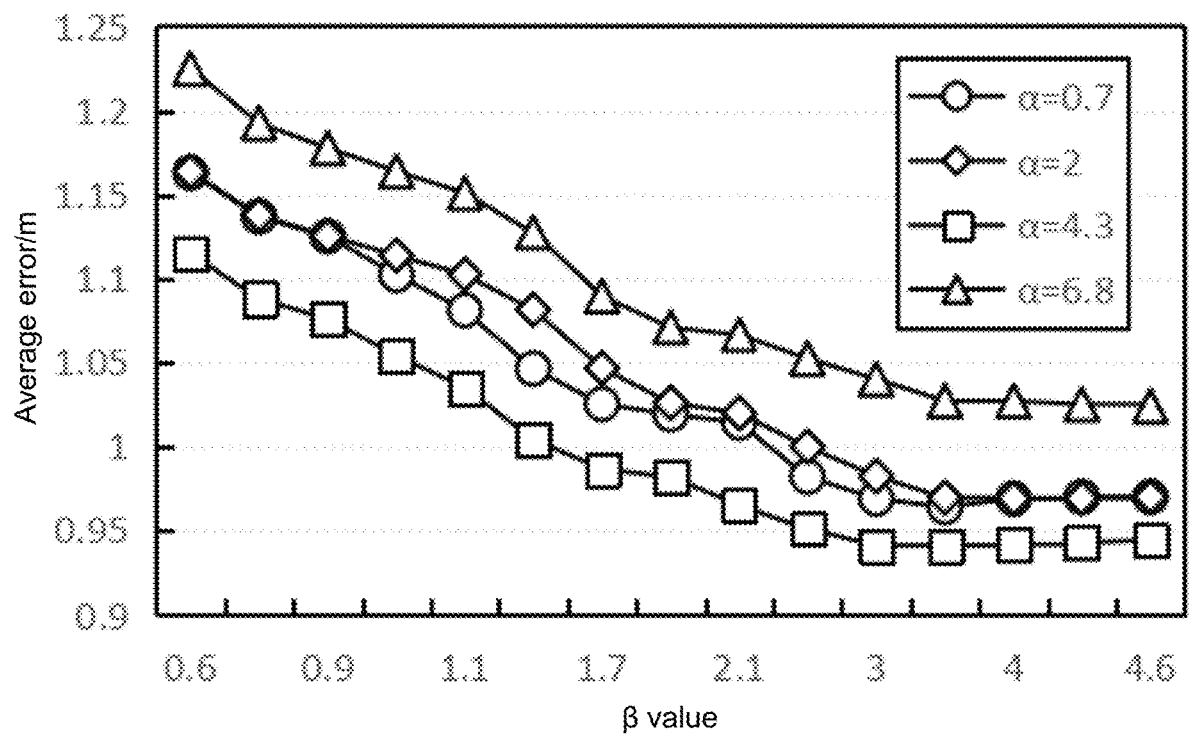
FIG. 5 is a graph showing the average error when α and β take different values.

As shown in FIG. 5: when α is a fixed value, the average error decreased first with the increase of β and then becomes stable. When β is 3.8, α is 4.3, the positioning accuracy is the highest, which shows that the weight index α and β have a greater influence on positioning error, and selecting the appropriate values of α and β can achieve the smallest average positioning error.

The KNN, GKNN, RW, and EDW algorithms are run on the same computer, respectively, and the above four algorithms are evaluated based on four indexes, including average error, largest error, smallest error and error variance, and the comparison result is as shown in Table 1.

It can be seen from Table 1 that the KNN algorithm without being subjected to Gaussian filtering has larger average error than the GKNN algorithm after Gaussian filtering by 0.187 m, and the error variance is larger by 0.2489, indicating that the noise in the indoor environment has a greater influence on the data. After Gaussian filtering, the stability of the positioning result and positioning accuracy are significantly improved.

TABLE 1

| Index | Average error/m | Largest average error/m | Smallest average error/m | Error variance |
| --- | --- | --- | --- | --- |
| KNN | 1.349 | 3.535 | 0.25 | 1.1354 |
| GKNN | 1.162 | 2.500 | 0.25 | 0.8865 |
| RW | 1.220 | 4.700 | 0.00 | 1.0016 |
| EDW | 0.965 | 2.921 | 0.0034 | 0.8754 |

Comparing the performance of the EDM algorithm with the other three algorithms, the average error of the EDW algorithm is decreased by 0.384 m, 0.197 m and 0.255 m than KNN, GKNN and RW algorithms respectively. The positioning accuracy is improved significantly. The difference between the largest error and the smallest error and the error variance are smaller than other algorithms, indicating that the EDW algorithm has relatively stable positioning performance as the influence of the environment is smaller.

Those skilled in the art will readily understand that the above description is only a preferred embodiment of the present disclosure and should not be construed as limiting the disclosure. Any modifications, substitutions, improvements, and so on made within the spirit and principles of the disclosure should fall within the scope of the present disclosure.

What is claimed is:

1. A fingerprint positioning method in a smart classroom, comprising an offline database establishing phase and an online positioning phase;

wherein, specifically, the offline database establishing phase comprises:

(S1) arranging P iBeacons inside a room as wireless signal transmitting terminals; gridding the room, defining an intersection point of a grid as an anchor node, recording a physical coordinate of the nth anchor node $L_n=(x_n, y_n)$, n=1 to N;

(S2) collecting a signal strength value $RSSI_{ij}^n$ transmitted by the jth iBeacon at the nth anchor node by a Bluetooth device, at the ith sampling moment, n=1 to N, i=1 to M, j=1 to P;

(S3) Gaussian filtering and averaging the M signal strength values transmitted by the jth iBeacon collected at the nth anchor node by the Bluetooth device by a data processing center, and an average is used as a standard signal strength value of the jth iBeacon collected at the nth anchor node and recorded as an original fingerprint $F_n = (P_{Ran1}, \ldots, P_{RanP})$, n=1 to N, comprising:

at the nth anchor node, n=1 to N, determining a confidence interval of the signal strength $$\left( \overline{RSSI_j^n} - 0.845 \frac{\sigma^n}{\sqrt{M}}, \overline{RSSI_j^n} + 0.845 \frac{\sigma^n}{\sqrt{M}} \right)$$

by the data processing center, wherein, $$\overline{RSSI_j^n} = \frac{1}{M} \sum_{i=1}^{M} RSSI_{ij}^n,$$

$$\sigma_n = \sqrt{\frac{1}{M-1} \sum_{i=1}^{M} (RSSI_{ij}^n - \overline{RSSI_j^n})^2}, \quad j = 1 \text{ to } P;$$

at nth anchor node, n=1 to N, extracting M' signal strengths $RSSI_{i',j}^n$, i'=1 to M' in the confidence interval, calculating the average of the extracted M' signal strengths $$P_{Ranj} = \frac{1}{M'} \sum_{i'=1}^{M'} RSSI_{i'j}^n, \quad j = 1 \text{ to } P$$

by the data processing center;

(S4) constituting a fingerprint database, n=1 to N, by the physical coordinate $L_n = (x_n, y_n)$ at the nth anchor node and a corresponding original fingerprint $F_n = (P_{Ran1}, \ldots, P_{RanP})$ by the data processing center;

wherein, specifically, the online positioning phase comprises:

(T1) collecting a signal strength value $RSSI_j$ transmitted by the jth iBeacon at a to-be-measured point by the Bluetooth device, j=1 to P;

(T2) according to the signal strength value $RSSI_j$, j=1 to P, searching for K anchor nodes that are the closest to its signal strength value in the fingerprint database as the reference anchor nodes by the data processing center;

(T3) calculating a coordinate (X, Y) of the to-be-measured point according to the reference anchor nodes by the data processing center:

$$\begin{cases} X = \omega_1 x_1 + \omega_2 x_2 + \ldots + \omega_k x_k \\ Y = \omega_1 y_1 + \omega_2 y_2 + \ldots + \omega_k y_k \end{cases},$$

$(x_k, y_k)$ is the coordinate of the kth reference anchor node among the searched K anchor nodes, $\omega_k$ is a weight coefficient, k=1 to K;

wherein in the weight coefficient $$\omega_k = \frac{(1/d_k)^\beta}{\sum_{k=1}^{K} (1/d_k)^\beta},$$

$d_k$ represents an Euclidean distance between the to-be-measured point and the kth reference anchor node, $\beta$ is a second weight index.

2. The fingerprint positioning method in the smart classroom according to claim 1, wherein the specific implementation of the step (T2) is: calculating the Euclidean distance $D(n) = \sqrt{\sum_{n=1}^{N} \omega'_j (P_{Ranj} - RSSI_j)^2}$ between the to-be-measured point and the anchor node according to the signal strength, j=1 to P, wherein $$\omega'_j = \frac{1}{|(RSSI_j)^\alpha|},$$

$\alpha$ is a first weight index.

3. A fingerprint positioning system in a smart classroom, comprising: P iBeacon wireless signal transmitting terminals, a Bluetooth device and a data processing center;

iBeacon for transmitting a wireless signal;

Bluetooth device for collecting the wireless signal;

a data processing center configured to position a to-be-measured point according to the collected wireless signal, specifically:

comprising an offline database establishing phase and an online positioning phase;

wherein, specifically, the offline database establishing phase comprises:

(S1) gridding a room, gridding an intersection point as an anchor node, recording a physical coordinate of the nth anchor node $L_n = (x_n, y_n)$, n=1 to N;

(S2) collecting a signal strength value $RSSI_{ij}^n$ transmitted by the jth iBeacon at the nth anchor node by the Bluetooth device, at the ith sampling moment, n=1 to N, i=1 to M, j=1 to P;

(S3) Gaussian filtering and averaging the M signal strength values transmitted by the jth iBeacon collected at the nth anchor node by the Bluetooth device by a data processing center, and an average is used as a standard signal strength values of the jth iBeacon collected at the nth anchor node and recorded as an original fingerprint $F_n = (P_{Ran1}, \ldots, P_{RanP})$, n=1 to N, comprising:

at the nth anchor node, n=1 to N, determining a confidence interval of the signal strength $$\left( \overline{RSSI_j^n} - 0.845 \frac{\sigma^n}{\sqrt{M}}, \overline{RSSI_j^n} + 0.845 \frac{\sigma^n}{\sqrt{M}} \right)$$

by the data processing center, wherein, $$\overline{RSSI_j^n} = \frac{1}{M} \sum_{i=1}^{M} RSSI_{ij}^n,$$

$$\sigma_n = \sqrt{\frac{1}{M-1} \sum_{i=1}^{M} (RSSI_{ij}^n - \overline{RSSI_j^n})^2}, \quad j = 1 \text{ to } P;$$

at nth anchor node, n=1 to N, extracting M' signal strengths $RSSI_{ij}^n = 1$ to M' in the confidence interval, calculating the average of the extracted M' signal strengths $$P_{Ranj} = \frac{1}{M'} \sum_{i'=1}^{M'} RSSI_{i'j}^n, \quad j = 1 \text{ to } P$$

by the data processing center;

(S4) constituting a fingerprint database, n=1 to N, by a physical coordinate $L_n = (x_n, y_n)$ at the nth anchor node and a corresponding original fingerprint $F_n = (P_{Ran1}, \ldots, P_{RanP})$ by the data processing center;

wherein, specifically, the online positioning phase comprises:

(T1) collecting the signal strength value $RSSI_j$ transmitted by the jth iBeacon at a to-be-measured point by the Bluetooth device, j=1 to P;

(T2) according to the signal strength value $RSSI_1$, j=1 to P searching for the K anchor nodes that are the closest to its signal strength value in a fingerprint database as a reference anchor nodes by the data processing center;

(T3) calculating a coordinate (X, Y) of the to-be-measured point according to the reference anchor nodes by the data processing center:

$$\begin{cases} X = \omega_1 x_1 + \omega_2 x_2 + \ldots + \omega_k x_k \\ Y = \omega_1 y_1 + \omega_2 y_2 + \ldots + \omega_k y_k \end{cases},$$

$(x_k, y_k)$ is the coordinate of the kth reference anchor node among the searched K anchor nodes, $\omega_k$ is a weight coefficient, k=1 to K;

wherein in the weight coefficient $$\omega_k = \frac{(1/d_k)^\beta}{\sum_{k=1}^{K}(1/d_k)^\beta},$$

$d_k$ represents an Euclidean distance between the to-be-measured point and the kth reference anchor node, $\beta$ is a second weight index.

4. The fingerprint positioning system in the smart classroom according to claim 3, wherein the specific implementation of the step (T2) is: calculating the Euclidean distance $D(n) = \sqrt{\sum_{n=1}^{N} \omega'_j \cdot (P_{Ran1} - RSSI_j)^2}$ between the to-be-measured point and the anchor node according to the signal strength, j=1 to P wherein, $$\omega'_j = \frac{1}{|(RSSI_j)^\alpha|},$$

$\alpha$ is a first weight index.

* * * * *